July 28, 1925.

1,547,400

H. A. KIMBER

DRIER

Filed Dec. 8, 1923

Inventor.

Harry A. Kimber

By Barnett Truman

Attorneys.

July 28, 1925. 1,547,400

H. A. KIMBER

DRIER

Filed Dec. 8, 1923 2 Sheets-Sheet 2

Inventor
Harry A. Kimber
By Barnett Truman
Attorneys.

top. This is accomplished by making or both walls slightly conical. I shown the outer wall as cylindrical and inner wall as conical. The outer slatted 19 is built up of I-beams 21 extending the top member 11 to the bottom mem- 14 of the shell, and of a plurality of wardly and inwardly disposed slats or 22, these slats or plates being formed eir ends with right angle flanges 23 ed to the webs 24 of the I-beams by 25, as shown in Figs. 4 and 5.

e inner wall is similarly constructed, ownwardly and outwardly extending or plates 26 arranged between and se- to I-beams 27 supported upon hori- l supports 28, 29 diametrically ar- ed and secured to the outer set of I- s 21 by means of angle gussets 30, r gussets 31 being employed for se- g the inner I-beams to the horizontal orts. The slats 26 of the inner wall an inclination opposite to that of the 22 of the outer wall, as shown in Fig. elow the annular space 32 between the and outer walls 20 and 21 and extend- rom the outer wall is a conical struc- 33 also preferably of slatted construc- and being built up of angle irons 34 downwardly and inwardly disposed or plates 35. A similar but smaller 38 built up in the same way but with ats reversedly disposed extends from the edge of the inner wall.

e slatted structures 19 and 20 have been ed to as substantially circular in cross n. It is not essential that they be, ly speaking, circular as they might be onal in cross section or polygonal with ger number of sides, the term "sub- ally circular" being intended to cover olygonal as well as strictly circular con- ction of the slatted structure.

e space 36 between the shell 10 and the slatted wall 19 is divided into upper lower chambers by a horizontal parti- 37. The shell is formed with a tan- ally arranged inlet port 38 leading to cation.

This application relates to apparatus for drying materials such, for example, as coal, and has for its objects to provide a drier, especially for coal or other bulky material, which will be small and compact in its structure in comparison with the drying capacity of the apparatus and so constructed as to use with the greatest effectiveness the gases employed in the drying operation.

The invention consists of the new and improved constructions, arrangements and devices to be hereinafter described and claimed, for carrying out the above stated objects and such other incidental objects as will be referred to in the following description of the preferred embodiment of the invention shown in the annexed drawings.

In the drawings—

Figure 1:
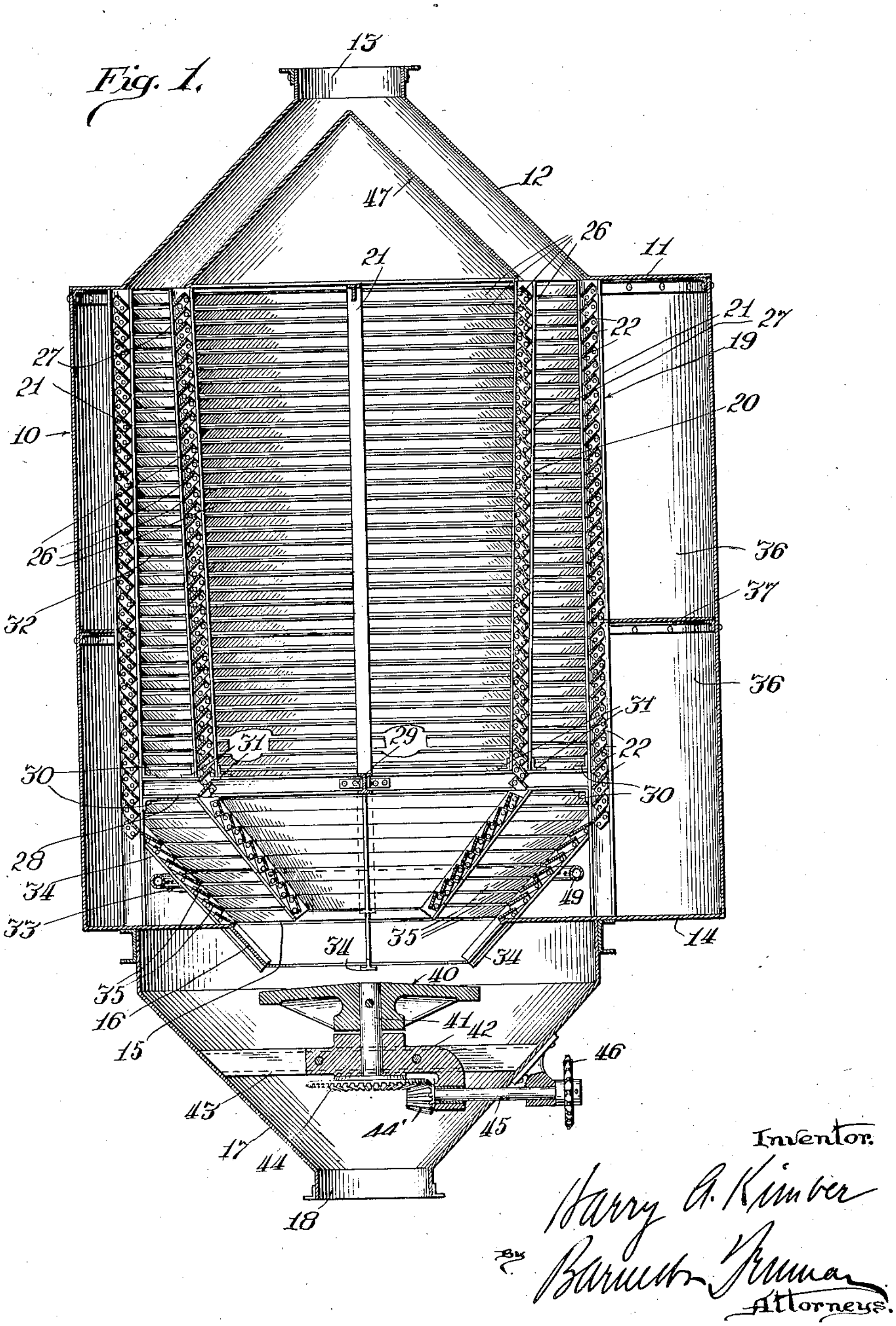
Fig. 1 is a vertical sectional view of the apparatus being taken on line 1—1 of Fig. 2.
Figures 2, 3, 4, 5:
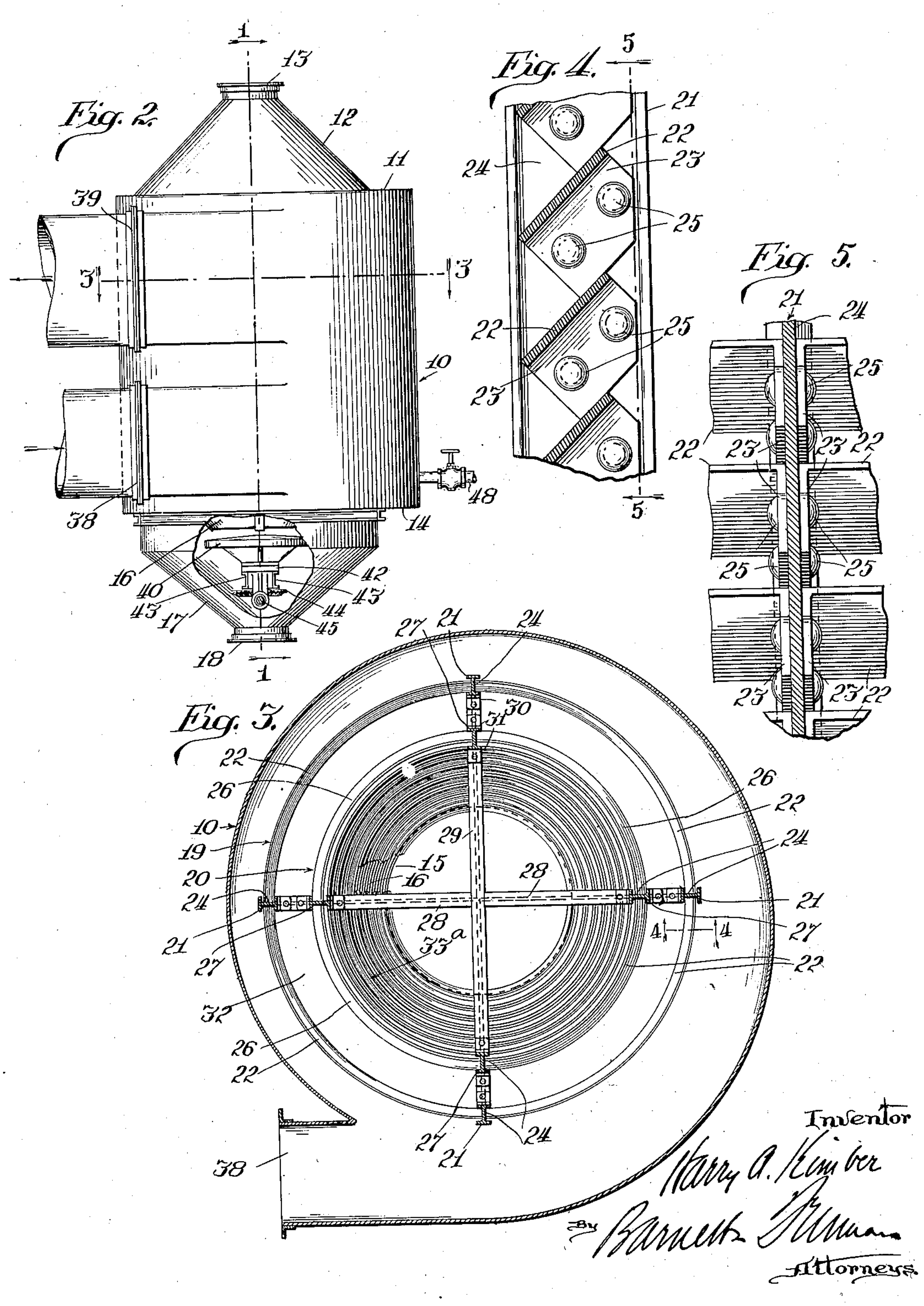
Fig. 2 is a side elevation of the same, on a smaller scale and with the lower part of the casing shown as broken away.
Fig. 3 is a sectional plan on line 3—3 of Fig. 2.
Fig. 4 is a fragmentary sectional view through one of the slotted walls.
Fig. 5 is a sectional view on line 5—5 of Fig. 4.

Referring to the drawings, 10 designates an approximately cylindrical shell having a top plate 11 on which, arranged eccentrically, is a conical member 12 formed with an opening 13 in the top into which the material to be dried is delivered. The bottom plate 14 of the shell has an opening 15 concentric with the axis of the conical member 12, and a conical flange 16 is provided around this opening. Secured to the bottom member 14 is a conical discharge chute 17 provided at the bottom with an opening 18.

Arranged in the shell 10 are two apertured wall structures, preferably of slatted construction which are substantially circular in cross section and are arranged, one within the other, the outer wall being designated the space below partition 37, and with an outlet port 39 leading from the space above the partition. These ports are for the circulation of a suitable gaseous drying agent through the interior of the shell. They communicate with the shell at substantially the widest portions of the space 36 between the shell and the outer one of the slatted walls. Arranged under the flange 16 with which the slatted hopper 33 aligns, is a discharging table 40 carried on a shaft 41 mounted in a bearing member 42 carried by a support 43 arranged in the discharge spout 17. To the lower end of shaft 41 is fixed a bevel gear 44 meshed by a bevel pinion 44′ on a shaft 45 provided at its outer end with a driving pulley 46. Extending upwardly from the inner slatted wall 20 is a distributing cone 47. A valved steam pipe (not shown) enters the casing 10 and has connected thereto a perforated steam ring 49 arranged below the cone 34.

*Operation.*—The material to be dried, coal, for example, is introduced into the drier through opening 13 and falling upon the distributing cone 47 is delivered to the space 32 between the outer and inner slatted walls 19 and 20. It descends in a solid column through this space and passing between the cones 33, 33ᵃ is delivered to the rotating table 40 which serves to prevent the coal from accumulating in the hopper. The gaseous drying agent, waste furnace gases for example, enters the space 36 below partition 37 through the intake port 38 and circulates around the shell due to the tangential arrangement of the intake. The gases pass through the spaces between the slats of hopper 33 and through the similarly formed apertures in the outer wall 19 and pass across the drying space in contact with the descending coal column and through the apertures in the inner wall 20. This is the course of the air in so far as the lower portion of the drier is concerned. In the upper part of the drier, that is to say, the portion above the level of partition 37, the flow of the drying agent is reversed. It first passes through the inner wall, then across the drying space and through the outer wall into the space in shell 10 above partition 37. From here it is discharged through the outlet port 39. The eccentric arrangement of the annular drying space with respect to shell 10 serves to equalize the flow of gases through all portions of the slatted walls. The slats 22, 26 are arranged to act as baffles, prolonging the contact of the drying agent with the material. The increasing width from top to bottom of the space through which the coal passes prevents bridging and insures proper downward flow of the material. In case of fire in the drier steam may be introduced therein through the pipe 49 to extinguish it.

Realizing that structural changes might be made in the apparatus without departure from the principles of my invention, it is my purpose to cover all modifications within the scope of the appended claims.

I claim:

1. In a drier, the combination of means constituting an annular drying space provided with apertured walls, means for directing material into and through said space, and means for causing a gaseous drying agent to pass first from the outside through the lower portion of the outer wall and the body of material and then through the inner wall, and thereafter back through the upper portions of said walls and body of material in the opposite direction.

2. In a drier, the combination of means constituting an annular drying space provided with apertured walls the lower portions of which are conical, means for directing material into said space to pass by gravity through said space, and means for causing a gaseous drying agent to pass through said apertured walls and across said drying space.

3. In a drier, the combination of means constituting an annular drying space provided with apertured walls the lower portions of which are conical, means for directing material into said space to pass by gravity through said space, means for causing a gaseous drying agent to pass through said apertured walls and across said drying space, and a rotating discharging table below said drying space.

4. In a drier, the combination of means constituting an annular drying space provided with apertured walls the lower portions of which are conical, means for directing material into said space to pass by gravity through said space, means for causing a gaseous drying agent to pass through said apertured walls and across said drying space inwardly in one place and outwardly in another, and a rotating discharging table below said drying space.

5. In a drier, the combination of means constituting an annular drying space provided with apertured walls, means for directing material into and through said drying space, a casing surrounding said apertured outer wall provided with a partition dividing the space between the same and said outer apertured wall into upper and lower annular chambers, there being a third central chamber enclosed by the inner wall of the drying space, and connections for the circulation of a gaseous drying agent into the lower chamber, through the drying space into the central chamber, thence back through the drying space to the upper chamber, and out from the upper chamber.

6. In a drier, the combination of means constituting an annular drying space provided with apertured walls, means for directing material into said space to pass through said space, a casing surrounding said outer wall provided with a partition dividing the space between the same and said outer apertured wall into upper and lower chambers having openings for circulation of a gaseous drying agent, said casing being positioned eccentrically with respect to the drying space and said openings being arranged at the wider portions of said chambers.

7. In a drier, the combination of means constituting an annular drying space provided with apertured walls, means for directing material into said space to pass through said space, a casing surrounding said outer apertured wall provided with a partition dividing the space between said casing and outer wall into upper and lower chambers, and means whereby a gaseous drying agent may be introduced into the lower chamber and discharged from the upper chamber.

8. In a drier, the combination of means constituting an annular drying space provided with apertured walls, means for directing material into said space to pass through said space, a casing surrounding said outer apertured wall provided with a partition dividing the space between said casing and outer wall into upper and lower chambers, and means whereby a gaseous drying agent may be introduced tangentially into the lower chamber and discharged from the upper chamber.

9. In a drier, the combination of means constituting an annular drying space provided with apertured walls, means for directing material into said space to pass through said space, a casing surrounding said outer apertured wall provided with a partition dividing the space between said casing and outer wall into upper and lower chambers, and means whereby a gaseous drying agent may be introduced into the lower chamber and discharged from the upper chamber, said casing being positioned eccentrically with respect to the annular drying space and said openings being arranged at the wider portions of said chambers.

10. In a drier, the combination of means constituting an annular drying space provided with apertured walls, means for directing material into said space to pass through said space, a casing surrounding said outer apertured wall provided with a partition dividing the space between said casing and outer wall into upper and lower chambers, and openings whereby a gaseous drying agent may be introduced tangentially into the lower chamber and discharged from the upper chamber, said casing being positioned eccentrically with respect to the annular drying space and said openings being arranged at the wider portions of said chambers.

11. In a drier, the combination of two walls substantially circular in cross section and of slatted construction, one arranged within the other, the bottom portions of which walls are conical, means for directing material into and through the space between said walls, and means for causing a gaseous drying agent to pass first inwardly and then outwardly through the material in said space.

12. In a drier, the combination of two walls substantially circular in cross section and of slatted construction, one arranged within the other, a pair of spaced conical members arranged above said walls, respectively, providing means for distributing material to said drying space, and means for causing a gaseous drying agent to pass first inwardly and then outwardly through the material in said space.

13. In a drier, the combination of two walls substantially circular in cross section and of slatted construction, one arranged within the other, a pair of spaced conical members arranged above said walls, respectively, providing means for distributing material to said drying space, a pair of conical structures below said walls, respectively, and means for causing a gaseous drying agent to pass first inwardly and then outwardly through the material in said space.

14. In a drier, the combination of two walls substantially circular in cross section and of slatted construction, one arranged within the other, the slats of which are arranged substantially horizontally and sloped downwardly and inwardly, means for directing material into and through the space between said walls, and means for causing a gaseous drying agent to pass inwardly and also outwardly through the material in said space.

15. In a drier, the combination of two walls substantially circular in cross section and of slatted construction, one arranged within the other, means for directing material into and through the space between said walls, a shell surrounding said slatted structure and provided with a partition dividing the space between the shell and outer slatted wall into upper and lower chambers, and means for introducing a gaseous drying agent into one of the chambers and discharging it from the other.

16. In a drier, the combination of two walls substantially circular in cross section and of slatted construction, one arranged within the other, means for directing material into and through the space between said walls, a shell surrounding said slatted structure and provided with a partition dividing the space between the shell and outer slatted wall into upper and lower chambers, and means for introducing a gaseous drying agent into the lower chamber and discharging it from the outer chamber.

17. In a drier, the combination of two walls substantially circular in cross section and of slatted construction, arranged one within the other, means for directing material into and through the space between said walls, a shell surrounding said slatted structure and arranged eccentrically with respect to the same and provided with a partition dividing the space between the shell and outer slatted wall into upper and lower chambers, and means for introducing a gaseous drying agent into one of the chambers tangentially and at the widest portion of said chamber and for discharging the same from the other chamber.

18. In a drier, the combination of two walls, substantially circular in cross section and of slatted construction one arranged within the other, means for directing material into and through the space between said walls, a shell surrounding said slatted structure and arranged eccentrically with respect to the same and provided with a partition dividing the space between the shell and outer slatted wall into upper and lower chambers, and means for introducing a gaseous drying agent into the lower chamber tangentially and at the widest portion of said chamber and for discharging the same from the upper chamber.

19. In a drier, the combination of concentrically arranged walls substantially circular in cross section and of slatted construction spaced one within the other and having substantially horizontal slats downwardly and inwardly inclined, an eccentrically arranged surrounding casing having a conical shell, a distributing cone above said inner slatted wall, a slatted cone extending from said inner and outer slatted walls, a rotating discharge table below said hopper, and a horizontal partition extending across the space between said shell and the outer slatted wall, the lower portion of said shell being provided, at the widest portion of the space between the shell and outer slatted wall with a tangential inlet port and the upper portion of the shell being provided with a similarly arranged outlet port.

20. In a drier, the combination of means constituting an annular drying space provided with apertured walls which diverge one from another, from top to bottom, means for directing material into and through said space, and a casing surrounding the outer wall provided with a partition dividing the space between the same and the outer apertured wall into upper and lower chambers having openings for circulation of a drying agent.

21. In a drier, the combination of an outer casing, two apertured walls, substantially circular in cross section and arranged one within the other to provide an annular space for material to be dried, means for causing a gaseous drying agent to pass through the material between said apertured walls, and means whereby steam may be introduced into said casing.

22. In a drier, the combination of an outer casing, two apertured walls, substantially circular in cross section and arranged one within the other to provide an annular space for material to be dried, means for causing a gaseous drying agent to pass through the material between said apertured walls, and a perforated steam pipe arranged in the lower portion of said outer casing.

23. In a drier, the combination of two walls substantially circular in cross section and of slatted construction, one arranged within the other, said walls diverging from top to bottom, means for directing material into and through the space between said walls, and means for causing a gaseous drying agent to pass first inwardly, then outwardly through the material in said space.

HARRY A. KIMBER.